United States Patent
Provost et al.

(10) Patent No.: US 7,272,286 B2
(45) Date of Patent: Sep. 18, 2007

(54) DISPERSION MANAGED HOM MULTIMODE OPTICAL FIBRE

(75) Inventors: Lionel Provost, Marcoussis (FR); Isabelle Bongrand, Cannes (FR); Carlos De Barros, Boulogne-Billancourt (FR)

(73) Assignee: Draka Comteq B.V., Amsterdam (NL)

( * ) Notice: Subject to any disclaimer, the term of this patent is extended or adjusted under 35 U.S.C. 154(b) by 238 days.

(21) Appl. No.: 11/018,696

(22) Filed: Dec. 22, 2004

(65) Prior Publication Data

US 2005/0254763 A1    Nov. 17, 2005

(30) Foreign Application Priority Data

Dec. 23, 2003 (FR) ................... 03 15226

(51) Int. Cl.
*G02B 6/16* (2006.01)
(52) U.S. Cl. ................. 385/123; 385/124; 398/81; 398/147
(58) Field of Classification Search ........... 385/37, 385/122, 123, 124, 127, 126; 398/81, 147
See application file for complete search history.

(56) References Cited

U.S. PATENT DOCUMENTS

| | | |
|---|---|---|
| 6,418,256 B1 | 7/2002 | Danziger et al. |
| 6,943,935 B2 * | 9/2005 | Bickham et al. ............... 398/81 |
| 7,151,880 B2 * | 12/2006 | Sartori ........................ 385/123 |
| 2002/0131160 A1 | 9/2002 | McNicol |
| 2003/0113083 A1 * | 6/2003 | Caplen et al. ............... 385/127 |
| 2004/0197060 A1 * | 10/2004 | White ......................... 385/123 |
| 2004/0197062 A1 * | 10/2004 | White ......................... 385/124 |
| 2005/0069269 A1 * | 3/2005 | Libori et al. ................. 385/125 |

FOREIGN PATENT DOCUMENTS

| | | |
|---|---|---|
| EP | 1 186 919 A1 | 3/2002 |
| FR | 2 842 610 | 1/2004 |
| GB | 1 475 478 | 6/1977 |
| WO | WO 00/16131 | 3/2000 |
| WO | WO 00/51268 | 8/2000 |
| WO | WO 0063732 | 10/2000 |

* cited by examiner

*Primary Examiner*—Frank G. Font
*Assistant Examiner*—James P. Hughes
(74) *Attorney, Agent, or Firm*—Sughrue Mion Pllc.

(57) ABSTRACT

The invention relates to the field of dispersion managed optical fibres for use in wavelength division multiplex transmission networks. A multimode optical fibre in which at least one higher-order mode can be propagated, is constituted radially by a single central core surrounded by an optical cladding (13), and comprises, for said higher mode or for at least one of said higher-order modes, positive chromatic dispersion optical fibre portions (D+) alternating longitudinally with negative chromatic dispersion optical fibre portions (D−).

13 Claims, 6 Drawing Sheets

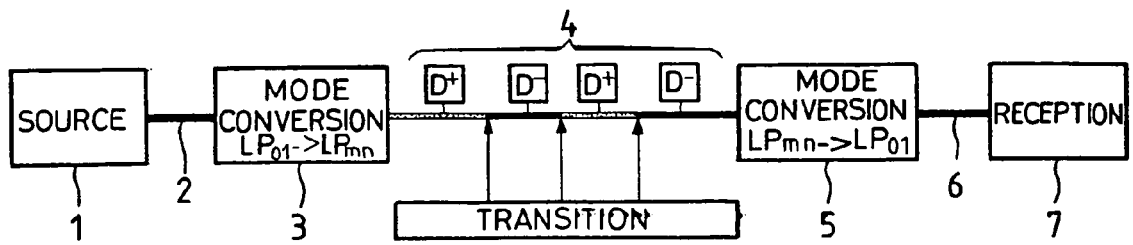

FIG_1

SOURCE (1) → MODE CONVERSION LP01->LPmn (3) → [D+ D- D+ D-] (4) TRANSITION → MODE CONVERSION LPmn->LP01 (5) → RECEPTION (7)

(2, 6 connecting fibers)

FIG_5

|  | λcth | 2w02 | Seff | λ0 | Δneff | C | C' | PC 10mm | PC 30mm 100 trs | PC 10mm | PC 30mm 100 trs |
|---|---|---|---|---|---|---|---|---|---|---|---|
|  | nm | μm | μm² | nm | X10³ | ps/nm-km | ps/nm²-km | dB/m | dB | dB/m | dB |
|  |  | 1550 | 1550 |  | 1550 | 1550 |  | 1550 | 1550 | 1625 | 1625 |
| RAY +3.23% | 2217 | 4.496 | 87 | 1350 | 5.92 | 4.0 | 0.0066 | 4.0E-10 | 7.2E-40 | 8.2E-07 | 2.2E-29 |
| RAY -3.23% | 2078 | 4.432 | 86 | N/A | 4.84 | -4.0 | -0.0009 | 2.0E-06 | 4.6E-28 | 1.5E-03 | 7.2E-19 |

FIG_8

|  | λcth | 2w02 | Seff | λ0 | Δneff | C | C' | PC 10mm | PC 30mm 100 trs | PC 10mm | PC 30mm 100 trs |
|---|---|---|---|---|---|---|---|---|---|---|---|
|  | nm | μm | μm² | nm | X10³ | ps/nm-km | ps/nm²-km | dB/m | dB | dB/m | dB |
|  |  | 1550 | 1550 |  | 1550 | 1550 |  | 1550 | 1550 | 1625 | 1625 |
| RAY +4.87% | 2460 | 5.34 | 88 | 1321 | 7.3 | 6 | 0.0088 | 3.8E-15 | 3.8E-56 | 2.7E-11 | 5.1E-44 |
| RAY -4.87% | 2229 | 4.436 | 86.5 | N/A | 5.66 | -6 | -0.0009 | 4.8E-09 | 9.6E-37 | 8.5E-06 | 1.9E-26 |

FIG_11

|  | λcth | 2w02 | Seff | λ0 | Δneff | C | C' | PC 10mm | PC 30mm 100 trs | PC 10mm | PC 30mm 100 trs |
|---|---|---|---|---|---|---|---|---|---|---|---|
|  | nm | μm | μm² | nm | X10³ | ps/nm-km | ps/nm²-km | dB/m | dB | dB/m | dB |
|  |  | 1550 | 1550 |  | 1550 | 1550 |  | 1550 | 1550 | 1625 | 1625 |
| RAY +4.17% | 2120 | 5.13 | 105.2 | 1306 | 3.94 | 5.0 | 0.0055 | 1.9E-03 | 3.1E-19 | 1.5E-01 | 6.0E-13 |
| RAY -4.17% | 1950 | 5.07 | 106.6 | N/A | 2.86 | -5.0 | 0.0039 | 4.8E-09 | 4.4E-10 | 2.9E+01 | 4.4E-05 |

FIG_14

|  | λcth | 2w02 | Seff | λ0 | Δneff | C | C' | PC 10mm | PC 30mm 100 trs | PC 10mm | PC 30mm 100 trs |
|---|---|---|---|---|---|---|---|---|---|---|---|
|  | nm | μm | μm² | nm | X10³ | ps/nm-km | ps/nm²-km | dB/m | dB | dB/m | dB |
|  |  | 1550 | 1550 |  | 1550 | 1550 |  | 1550 | 1550 | 1625 | 1625 |
| RAY +6.09% |  | 7.264 | 240.3 | 1390 | 4.17 | 7 | 0.0254 | 5.6E-01 | 2.6E-18 | 7.1E+00 | 1.8E-14 |
| RAY -6.09% |  | 7.486 | 275.8 | 1745 | 3.41 | -7 | -0.0056 | 3.5E+01 | 1.1E+03 | 2.5E+02 | 1.1E-08 |

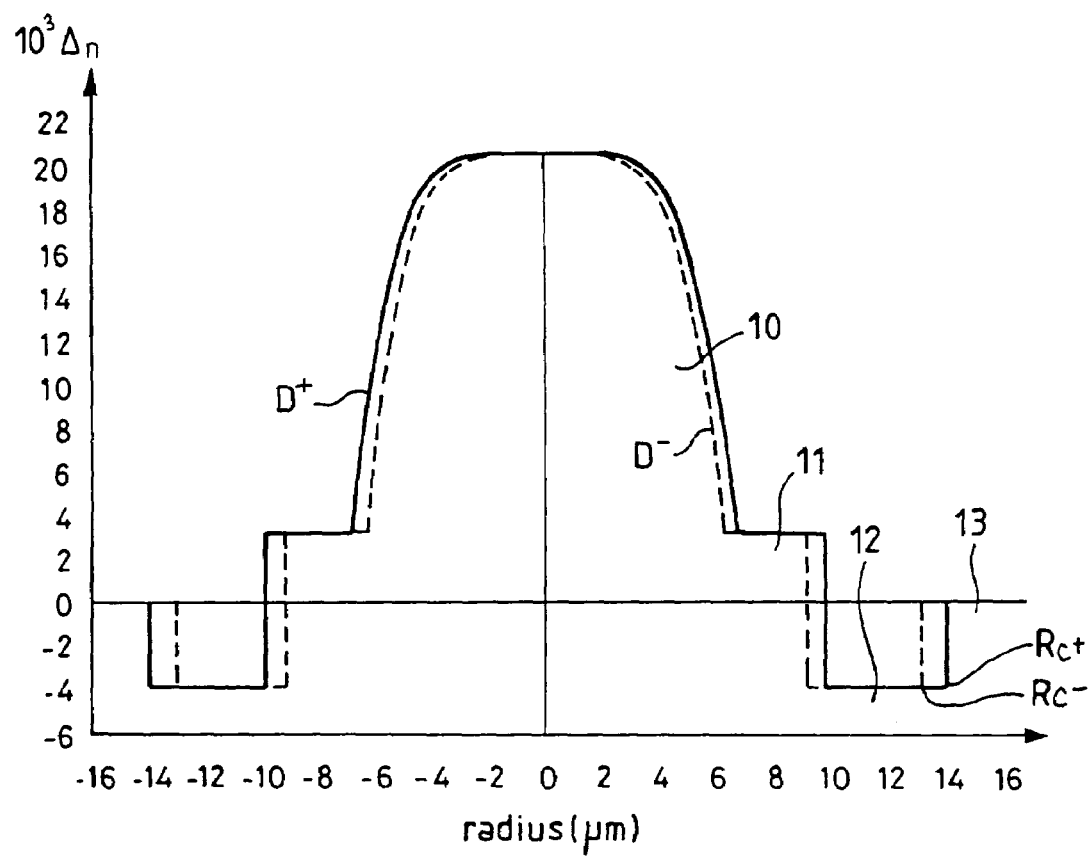

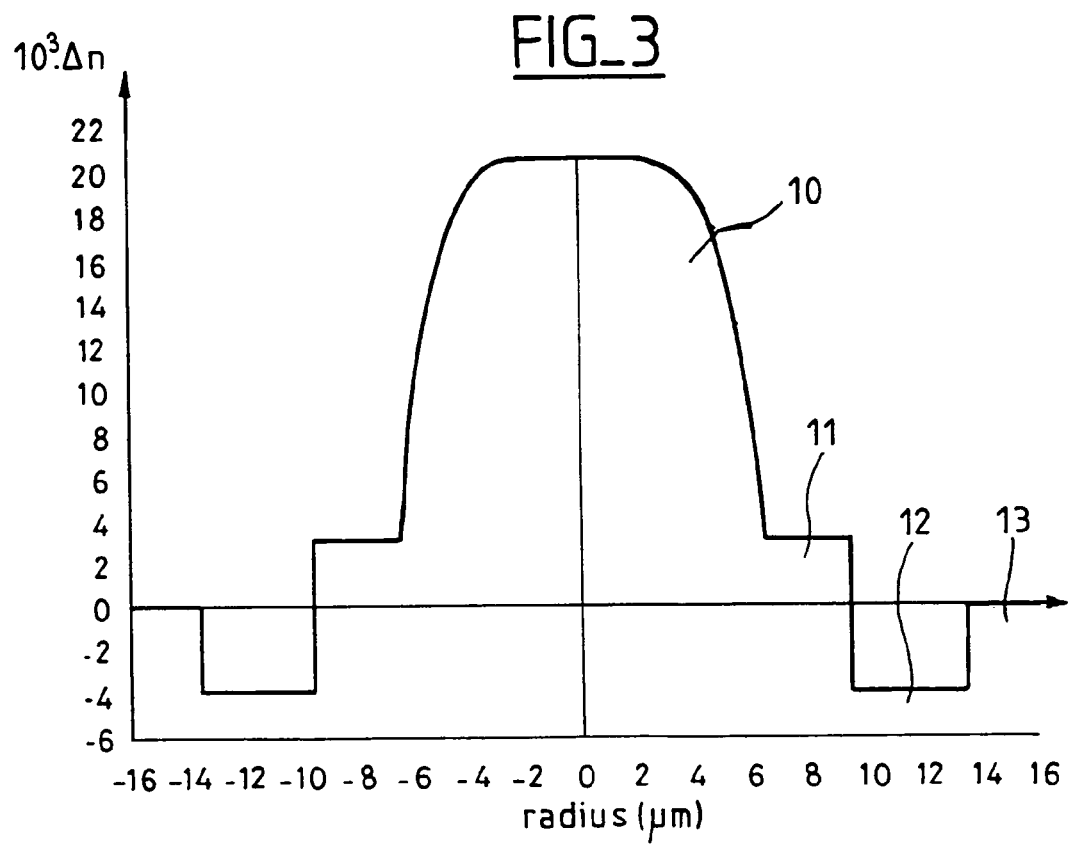
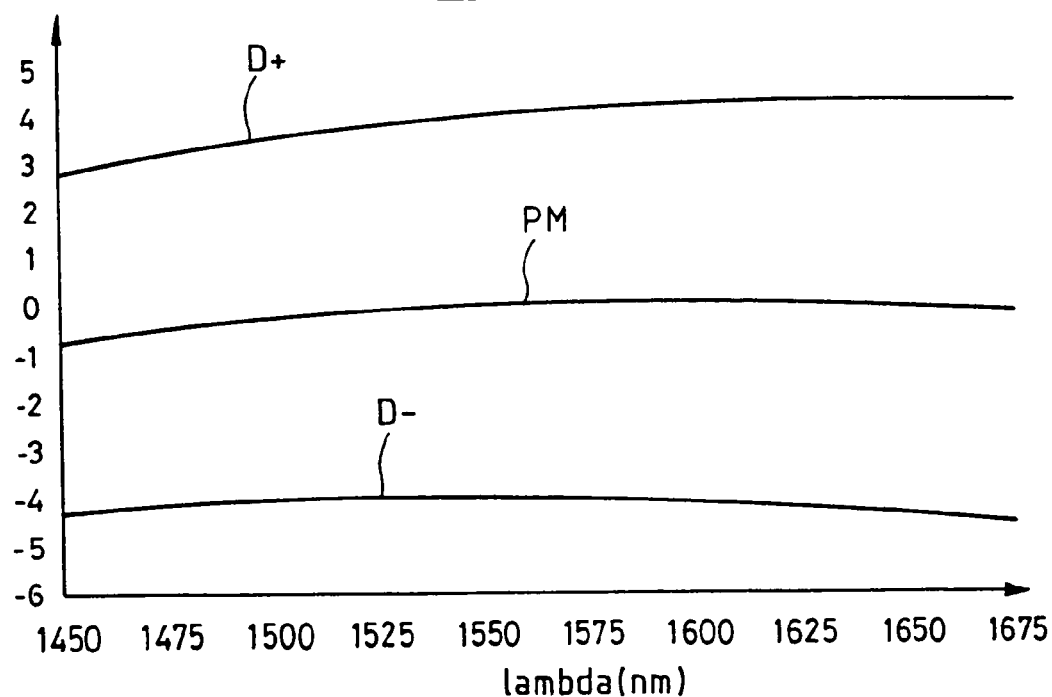

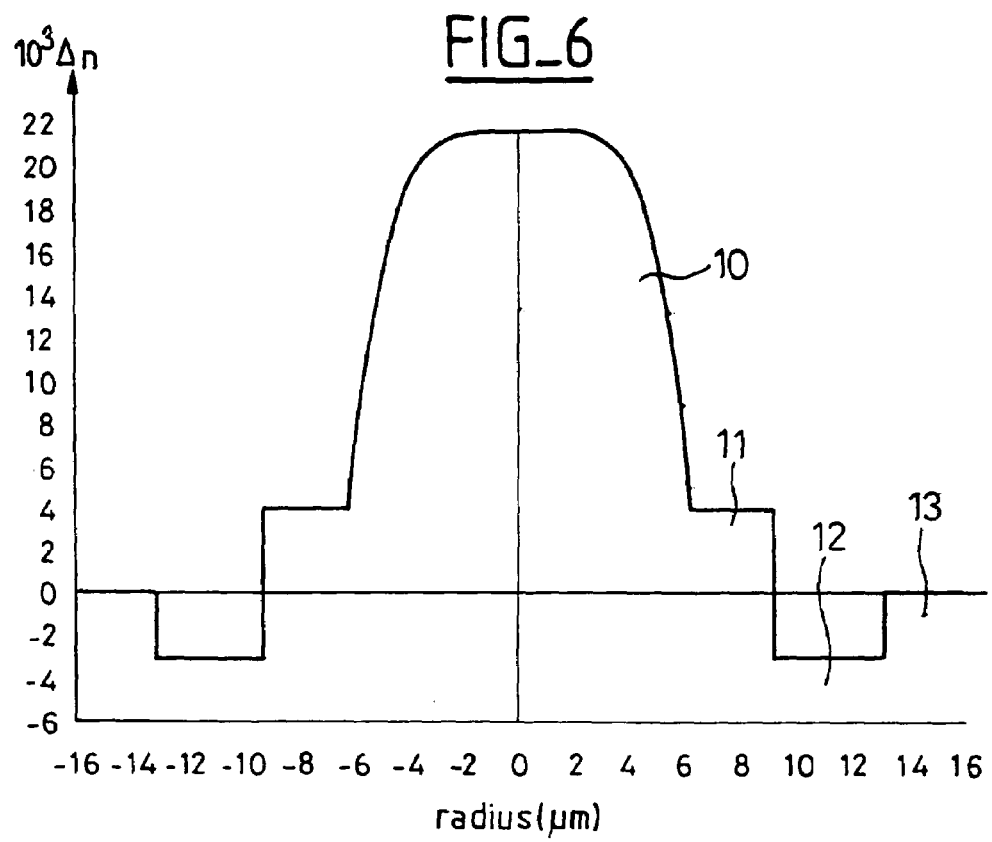
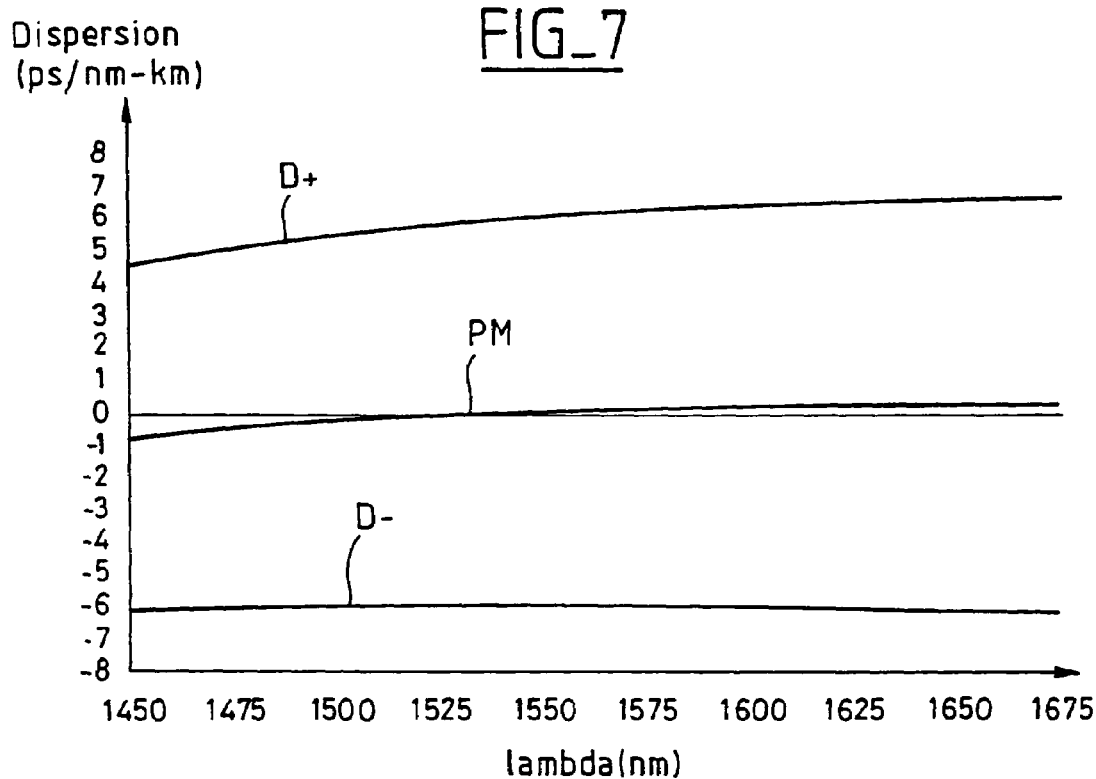

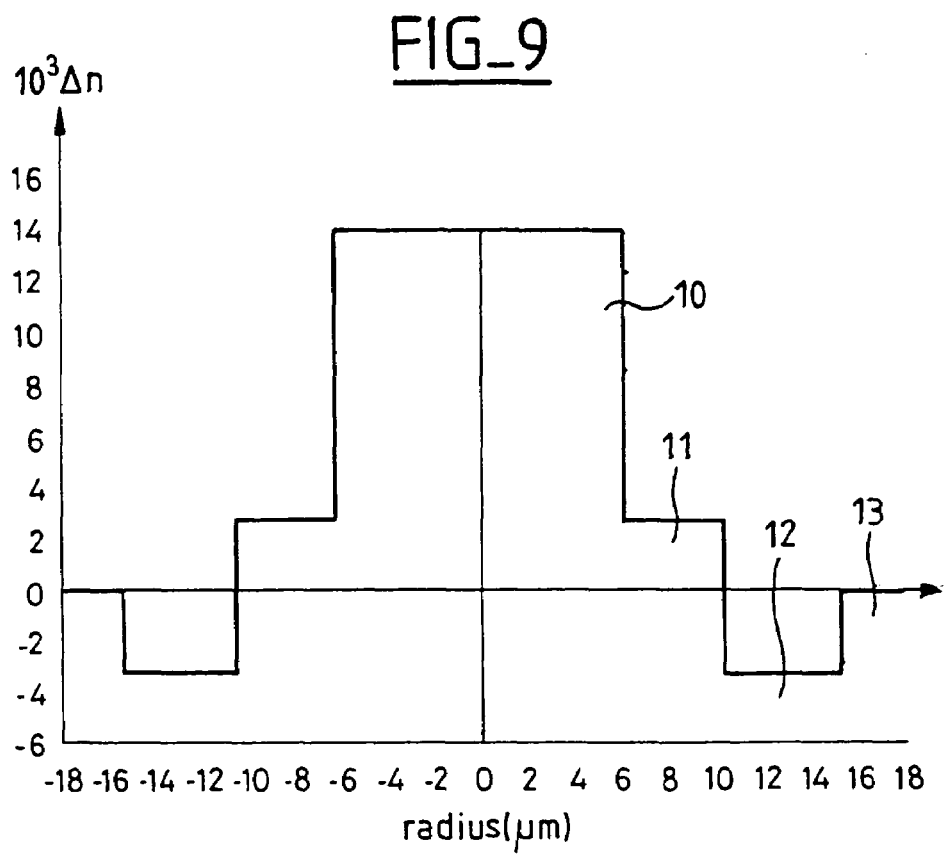
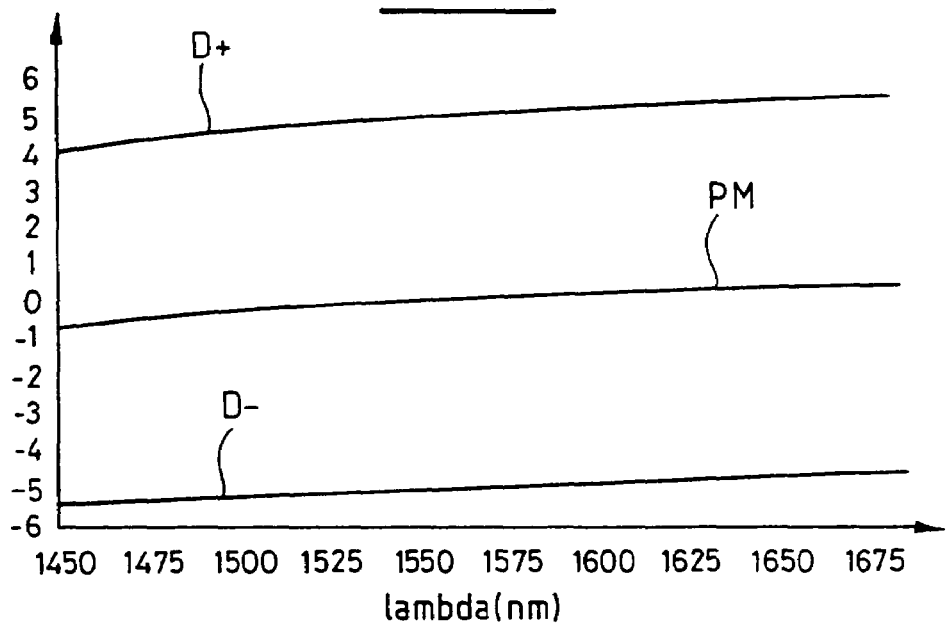

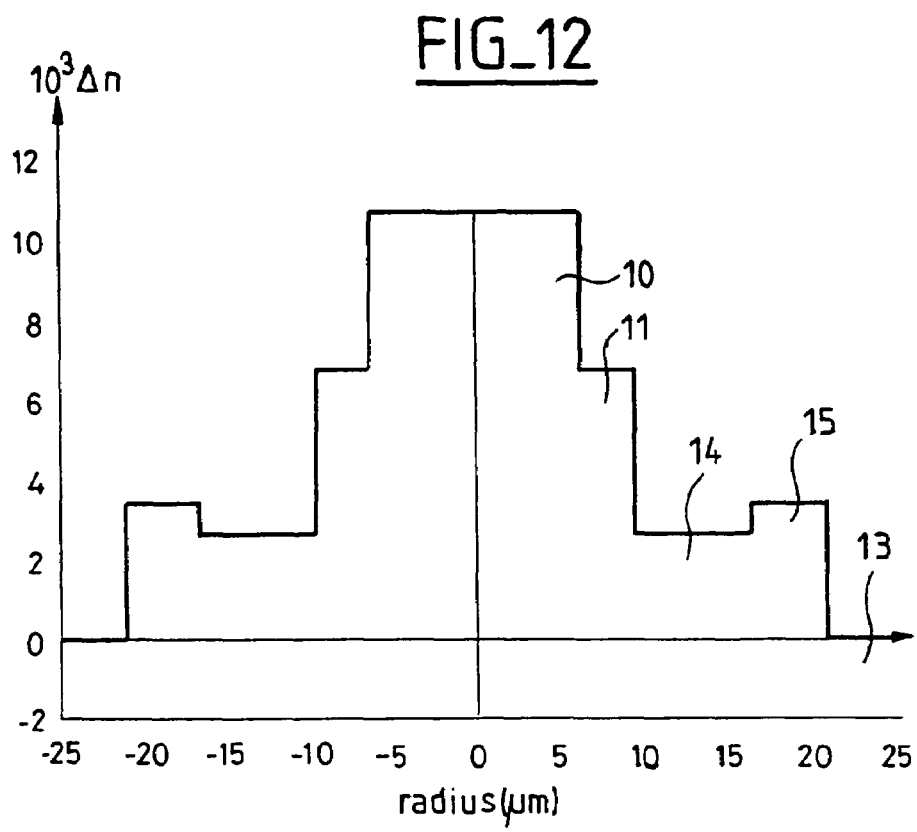
FIG_12
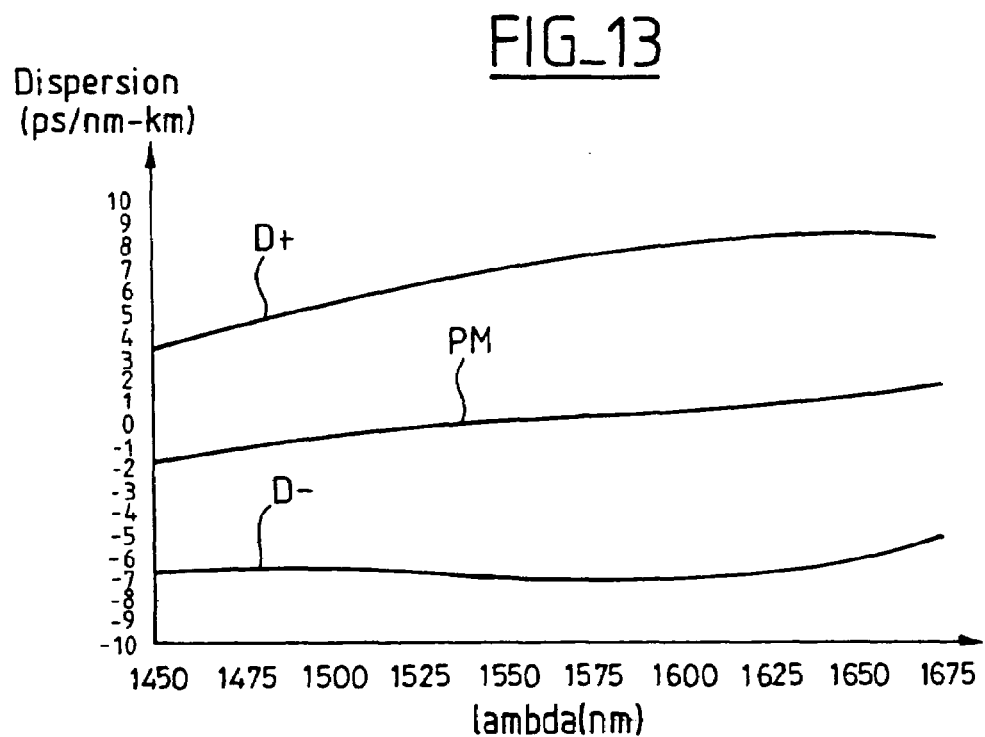
FIG_13

DISPERSION MANAGED HOM MULTIMODE OPTICAL FIBRE

The invention relates to the field of dispersion managed optical fibres ("DMF" standing for "dispersion managed fibre") preferably for use in wavelength division multiplex transmission networks. A dispersion managed optical fibre is an optical fibre comprising positive chromatic dispersion optical fibre portions alternating longitudinally with negative chromatic dispersion optical fibre portions. A dispersion managed optical fibre is generally intended to be used in a wavelength division multiplex transmission network, preferably in one or more of the following bands: the S-band, extending from 1460 nm to 1530 nm, the C-band, extending from 1530 nm to 1570 nm, the L-band, extending from 1570 nm to 1625 nm, the U-band, extending from 1625 to 1675 nm.

According to a first prior art, described for example in the international patent application WO 00/63732, a dispersion managed monomode optical fibre is known in which the only guided mode being propagated effectively is the $LP_{01}$ mode, having an effective surface area which can reach 60 $\mu m^2$, to the detriment of a peripheral (i.e. outside) core radius exceeding 20 $\mu m$. A drawback of this prior art is that it has a relatively small ratio of effective surface area to core section (corresponding to the square of the outside core radius multiplied by $\pi$), of approximately 5% at most.

According to a second prior art, described for example in the international patent application WO 00/16131, an optical fibre comprising several cores is known, some with positive chromatic dispersion and others with negative chromatic dispersion, converters allowing the signal to pass from one core to the other in order to alternately undergo a positive chromatic dispersion and a negative chromatic dispersion. A drawback of this prior art is its great complexity.

According to a third prior art, described for example in the French patent application FR 2842610, a monomode dispersion managed optical fibre is known having an effective surface area of approximately 40 $\mu m^2$. A drawback of this prior art is the relatively low value of the effective surface area.

According to a fourth prior art, described for example in the American patent U.S. Pat. No. 6,418,256, a transmission system is known comprising in succession a monomode line optical fibre conveying the signal in $LP_{01}$ mode, a mode converter changing the fundamental $LP_{01}$ mode to the higher-order mode $LP_{02}$, an optical fibre-compensating for chromatic dispersion of the signal in $LP_{02}$ mode. This system which uses a monomode optical fibre and a multimode optical fibre separated by a converter is totally different from and more complex than a dispersion managed optical fibre.

According to a fifth prior art, International application WO 00/51268 relates to an optical transmission system for transmitting an optical signal having optical energy, said system comprising:

- a spatial mode transformer positioned to receive said optical signal, wherein said spatial mode transformer transforms said optical signal having optical energy in a low order spatial mode to an optical signal having optical energy in a high order spatial mode; and
- an optical fiber in optical communication with said spatial mode transformer, wherein said optical fiber transmits substantially all of said optical energy in said high order spatial mode. It is to be noted that the low order spatial mode is the fundamental spatial mode and that the high order spatial mode is the $LP_{02}$ spatial mode. This document does not provide an optical fiber comprising several cores, some with positive chromatic dispersion and others with negative. chromatic dispersion.

The invention relates to a multimode dispersion managed optical fibre, the signal being propagated in a higher-order mode and not in the fundamental mode, thus combining the simplicity of a single-core optical fibre with a better trade-off of opto-geometric properties such as the effective surface area and/or the ratio of effective surface area to core section. The higher-order mode also allows a better trade-off between on the one hand a high effective surface area and on the other hand a small chromatic dispersion slope, while maintaining a reasonable core section so that the cost of producing the optical fibre is not too high.

According to the invention, a multimode optical fibre is provided in which at least one higher-order mode can be propagated, being constituted radially by a single central core surrounded by an optical cladding, characterized in that the optical fibre comprises, for said higher mode or for at least one of said higher-order modes, positive chromatic dispersion optical fibre portions (D+) alternating longitudinally with negative chromatic dispersion optical fibre portions (D−).

The invention will be better understood and other characteristics and advantages will appear with the help of the description below and the attached drawings, given by way of example, where:

FIG. 1 schematically represents an optical transmission system incorporating a dispersion managed optical fibre according to the invention;

FIG. 2 schematically represents a diagram in which the index profiles are represented as a function of the radius for the two types of optical fibre portions having chromatic dispersion with opposite signs;

FIG. 3 schematically represents the average index profile as a function of the radius of a first example of dispersion managed optical fibre according to the invention;

FIG. 4 schematically represents the dispersion curve as a function of the wavelength of the first example of dispersion managed optical fibre according to the invention;

FIG. 5 schematically represents a set of opto-geometric properties of the first example of dispersion managed optical fibre according to the invention;

FIGS. 6, 9, 12 schematically represent the average index profile as a function of the radius of respectively the second, third and fourth examples of dispersion managed optical fibre according to the invention;

FIGS. 7, 10, 13 schematically represent the dispersion curve as a function of the wavelength of respectively the second, third and fourth examples of dispersion managed optical fibre according to the invention;

FIGS. 8, 11, 14 schematically represent a set of opto-geometric properties of the second, third and fourth examples of dispersion managed optical fibre according to the invention.

FIG. 1 schematically represents an example of a system incorporating a dispersion managed optical fibre according to the invention. The system comprises in succession a source 1 emitting a light signal, a section 2 of monomode optical fibre transmitting essentially the fundamental mode $LP_{01}$, a mode converter 3 converting the signal from the fundamental mode $LP_{01}$ into a higher-order mode $LP_{mn}$, the dispersion managed optical fibre 4 according to the invention, a mode converter 5 converting the signal from the higher-order mode. $LP_{mn}$ into the fundamental mode $LP_{01}$, a section 6 of monomode optical fibre transmitting essentially the fundamental mode $LP_{01}$, a light signal receiver 7.

The dispersion managed optical fibre 4 comprises an alternation of positive chromatic dispersion optical fibre portions D+ and negative chromatic dispersion optical fibre portions D−. Only four portions are represented in FIG. 1 for the sake of simplicity, but the optical fibre 4 can comprise many more. Between two D+ portions there is a D−portion. Between two D− portions there is a D+ portion.

The D+ and D− portions are for example of the same length, but can also be of different lengths. The positive chromatic dispersion values, per unit of length, of the different positive chromatic dispersion portions are preferably all more or less equal to one another. The negative chromatic dispersion values, per unit of length, of the different negative chromatic dispersion values are preferably all more or less equal to one another, and are advantageously also equal in absolute value to the positive chromatic dispersion values, per unit of length, of the different positive chromatic dispersion portions. The sum of the chromatic dispersions of the different portions of optical fibre, weighted by the respective lengths of said different portions, corresponds to the residual dispersion of the dispersion managed optical fibre. Each given application requires a maximum residual dispersion threshold which is not to be exceeded on pain of degradation of the operation of the application considered. The dispersion and length values of the different portions are chosen, for each given application, so as to not exceed this maximum residual dispersion threshold. Preferably, this residual dispersion is close to zero over a spectral range as wide as possible.

The dispersion managed optical fibre has an alternation of positive chromatic dispersion optical fibre portions and negative chromatic dispersion optical fibre portions, the change in chromatic dispersion value preferably being obtained by a homothetic change of the radial dimensions of the core index profile. This change can be achieved in at least four different ways.

According to the first method, the outside diameter of the optical fibre is changed during the drawing out of the optical fibre from a preform. According to the second method, the change can occur with a constant outside diameter of the optical fibre and by varying longitudinally the diameter of the reloaded preform from which the optical fibre is drawn out. According to the third method, pieces of at least two different sliced preforms alternate to reconstitute a preform which will then be drawn out. According to a fourth method, several portions of at least two different optical fibres are alternatively welded or connected end-to-end. The first two methods are more practical and more effective than the others.

Preferably, the dispersion managed optical fibre according to the invention is obtained by drawing out the same preform with a modification of the properties of said one preform. The relative difference of the peripheral radius of the core, $(Rc_+ - Rc_-)/Rc_+$, between the positive chromatic dispersion optical fibre portions and the negative chromatic dispersion optical fibre portions, is advantageously chosen to be less than 11%, the signal thus crossing between the different portions with less loss.

The transitions between optical fibre portions with positive dispersion and with negative dispersion respect the criteria of adiabaticity, i.e. that the transition must be sufficiently progressive in proportion to the dimensions of the core of the optical fibre, which is broadly respected in practice, in particular when the first two methods are used, in order to avoid a coupling of the propagation modes in the transition, which would appreciably degrade the quality of the signal transmitted by the optical fibre.

FIG. 2 schematically represents a diagram in which the index profiles are represented as a function of the radius of the two types of optical fibre portions having chromatic dispersion with opposite signs. On the abscissa there is represented the value of the radius of the core, called radius and expressed in μm, starting from the centre of the optical fibre which has a rotational symmetry about its optical axis. On the ordinate there is represented the value multiplied by one thousand and without a unit of the index difference compared with the cladding index, i.e. the index of the point of the core considered less the cladding index, said index difference being called Δn. The curves represented are core index profile curves as a function of the core radius, the cladding index being arbitrarily set to zero.

A simple radial homothetic transformation with a coefficient less than unity permits a change from the core index profile of a positive chromatic dispersion optical fibre portion to the core index profile of a negative chromatic dispersion optical fibre portion. The index profile of the positive chromatic dispersion optical fibre portion is represented by solid lines, curve D+, while the index profile of the negative chromatic dispersion optical fibre portion is represented by broken lines, curve D−. The value of the index profiles of FIG. 2, and those of the other figures, are given at the wavelength 633 nm because this is the customary wavelength for measuring index profiles on a preform. However they are not very different at the transmission wavelengths used, such as for example 1550 nm, and a given index profile at 633 nm is enough for a person skilled in the art to produce the corresponding optical fibre. Each index profile, in FIG. 2, is constituted successively by three slices, namely a central slice 10, a pedestal 11, a buried slice 12, followed by the constant-index cladding 13. The central slice 10 is a rounded step, i.e. ending in a gradient, the pedestal 11 is a step, and the buried slice 12 is a step, a step being a rectangular slice. $Rc_+$ represents the peripheral core radius for the positive chromatic dispersion optical fibre portion. $Rc_-$ represents the peripheral core radius for the negative chromatic dispersion optical fibre portion. The whole of the index as a function of the radius, between the centre of the optical fibre and the core periphery, is high enough for the optical fibre to be multimode and for a higher-order mode to be able to be propagated in said optical fibre.

Preferably, in the dispersion managed optical fibre according to the invention, each D+ or D− optical fibre portion has, at the wavelength 1550 nm in said higher-order mode, a chromatic dispersion slope whose absolute value is less than 0.015 ps/nm$^2$-km so as to be able to easily change the sign of the chromatic dispersion slope by a small radius variation only. Thus a small average chromatic dispersion slope for the dispersion managed optical fibre according to the invention can be obtained, which means that said fibre can be used advantageously over a wide spectral band.

In the dispersion managed optical fibre according to the invention each D+ or D− optical fibre portion has, at the wavelength 1550 nm in said higher-order mode, a relatively high effective surface area, which is preferably greater than 70 μm$^2$, preferably greater than 80 μm$^2$, and advantageously greater than 200 μm$^2$. A high effective surface area allows a better behaviour of the optical fibre when it is subjected to a high refractive power thanks to a better resistance to non-linear effects.

The higher-order mode in which the signal is transmitted is preferably the LP$_{02}$ mode. However it could also be for example the $LP_{11}$ mode or the $LP_{03}$ mode, or also another higher mode. Each higher-order mode is different from the fundamental mode $LP_{01}$.

Different forms of core index profile can be used to produce a dispersion managed optical fibre according to the invention. Some are better than others at producing a better trade-off between the different properties of the dispersion managed optical fibre, such as for example reducing the chromatic dispersion slope by increasing the effective surface area, while still preserving a limited core section. Preferably, the variable core index profile comprises at least three slices, even at least four slices. In an embodiment corresponding to the fourth example described in FIGS. 12 to 14, all the slices of the core have an index greater than the cladding index. In another embodiment corresponding to the first, second and third examples described in FIGS. 3 to 11, only the slice of the core which is most distant from the centre has an index lower than the cladding index.

Preferably, in order to produce the best trade-off between a small chromatic dispersion slope and a large effective surface area, in the dispersion managed optical fibre according to the invention, the central slice of the core has an index greater than that of the cladding and the slice in contact with the central slice is a pedestal whose index is between that of the cladding and that of the central slice.

Preferably, the dispersion managed optical fibre according to the invention has a ratio of effective surface area to core section of at least 10% at 1550 nm.

FIG. 3 schematically represents the average index profile as a function of the radius of a first example of dispersion managed optical fibre according to the invention. The average index profile corresponds to the profile from which are obtained the index profiles of the D+ and D− portions having respectively positive chromatic dispersion and negative chromatic dispersion. The D+ portion index profile is obtained by means of an increasing radial homothetic transformation from the average index profile; +3.23% on FIG. 3 which corresponds to a coefficient 1.0323. The D− portion index profile is obtained by means of shrinking radial homothetic transformation from the average index profile; −3.23% on FIG. 3 which corresponds to a coefficient 0.9677. On the abscissa there is represented the value of the core radius in µm starting from the centre of the optical fibre which has a rotational symmetry about its optical axis. On the ordinate is represented the value of the index difference compared with the cladding index multiplied by one thousand and without a unit meaning that the index at the place of the core being less than the index of the cladding, which difference in the index is given by Δn. The curve represented is the curve of the core index profile as a function of the core radius, the cladding index being arbitrarily set at zero. The values of the index profiles of FIG. 3, like those of the other figures, are given at the wavelength 633 nm. The index profile in FIG. 3 is constituted successively by three slices, namely a central slice 10, a pedestal 11, a buried slice 12, followed by the constant-index cladding 13. The central slice 10 is a rounded step, i.e. ending in a gradient, the pedestal 11 is a step, and the buried slice 12 is a step, a step being a rectangular slice.

FIG. 4 schematically represents the dispersion curve as a function of the wavelength of the first example of dispersion managed optical fibre according to the invention. Three chromatic dispersion curves, expressed in ps/nm-km on the ordinate, as a function of the wavelength, called lambda and expressed in nm on the abscissa, are represented. The curve PM represents the chromatic dispersion curve as a function of the wavelength of the average index profile represented in FIG. 3. The curve D+ represents the chromatic dispersion curve as a function of the wavelength of the index profile of the positive chromatic dispersion optical fibre portion obtained by radial homothetic transformation with a coefficient 1.0323, i.e. by an increase of 3.23%. The curve D− represents the chromatic dispersion curve as a function of the wavelength of the index profile of the negative chromatic dispersion optical fibre portion obtained by radial homothetic transformation with a coefficient 0.9677, i.e. by shrinkage of 3.23%.

FIG. 5 schematically represents a set of opto-geometric properties of the first example of dispersion managed optical fibre according to the invention. The first line for value RAY+3.23% corresponds to the positive chromatic dispersion optical fibre portion D+ and means that the average profile has been increased by 3.23% to obtain said D+ portion. The second line for value RAY−3.23% corresponds to the negative chromatic dispersion optical fibre portion D− and means that the average profile has been shrunk by 3.23% to obtain said D− portion.

The first column next to the names of the optical fibre portions represents the theoretical cut-off wavelength called λcth and expressed in nm. The next column represents the mode diameter at 1550 nm called $2w_{02}$ and expressed in µm. The next column represents the effective surface area at 1550 nm called $S_{eff}$ and expressed in µm$^2$. The next column represents the zero-dispersion wavelength called λ0 and expressed in nm, i.e. the wavelength for which the chromatic dispersion cancels itself out. The next column represents one thousand times the effective index difference of the core at 1550 nm, this difference being called Δneff. The next column represents the chromatic dispersion, at 1550 nm called C and expressed in ps/nm·km. The next column represents the chromatic dispersion slope at 1550 nm called C' and expressed in ps/nm$^2$·km. The next column represents the curvature losses at 1550 nm called PC 10 mm and expressed in dB/m when the optical fibre portion is wound onto a sleeve having a radius of 10 mm. The next column represents the curvature losses at 1550 nm called PC 30 mm $100_{coils}$ and expressed in dB when the optical fibre portion is wound onto 100 coils of a sleeve having a radius of 30 mm. The next column represents the curvature losses at 1625 nm called PC 10 mm and expressed in dB/m when the optical fibre portion is wound onto a sleeve having a radius of 10 mm. The next column represents the curvature losses at 1625 nm called PC 30 mm $100_{coils}$ and expressed in dB when the optical fibre portion is wound onto 100 coils of a sleeve having a radius of 30 mm.

FIG. 6 schematically represents the average index profile as a function of the radius of a second example of dispersion managed optical fibre according to the invention.

FIG. 7 schematically represents the dispersion curve as a function of the wavelength of the second example of dispersion managed optical fibre according to the invention. The curve D+ represents the chromatic dispersion curve as a function of the wavelength for the index profile of the positive chromatic dispersion optical fibre portion obtained by radial homothetic transformation with a coefficient 1.0487, i.e. by an increase of 4.87%. The curve D− represents the chromatic dispersion curve as a function of the wavelength for the index profile of the negative chromatic dispersion optical fibre portion obtained by radial homothetic transformation with a coefficient 0.9513, i.e. by shrinkage of 4.87%.

FIG. 8 schematically represents a set of opto-geometric properties of the second example of dispersion managed optical fibre according to the invention.

FIG. 9 schematically represents the average index profile as a function of the radius of a third example of dispersion managed optical fibre according to the invention.

FIG. 10 schematically represents the dispersion curve as a function of the wavelength of the third example of dispersion managed optical fibre according to the invention. The curve D+ represents the chromatic dispersion curve as a function of the wavelength for the index profile of the positive chromatic dispersion optical fibre portion obtained by radial homothetic transformation with a coefficient 1.0417, i.e. by an increase of 4.17%. The curve D− represents the chromatic dispersion curve as a function of the wavelength for the index profile of the negative chromatic dispersion optical fibre portion obtained by radial homothetic transformation with a coefficient 0.9583, i.e. by shrinkage of 4.17%.

FIG. 11 schematically represents a set of opto-geometric properties of the third example of dispersion managed optical fibre according to the invention.

FIG. 12 schematically represents the average index profile as a function of the radius of a fourth example of dispersion managed optical fibre according to the invention. The index profile is constituted by four slices in step form, which are successively starting from the centre, a central slice, a pedestal, a peripheral slice 14, another peripheral slice 15, followed by the cladding 13.

FIG. 13 schematically represents the dispersion curve as a function of the wavelength of the fourth example of dispersion managed optical fibre according to the invention. The curve D+ represents the chromatic dispersion curve as a function of the wavelength for the index profile of the positive chromatic dispersion optical fibre portion obtained by radial homothetic transformation with a coefficient 1.0609, i.e. by an increase of 6.09%. The curve D− represents the chromatic dispersion curve as a function of the wavelength for the index profile of the negative chromatic dispersion optical fibre portion obtained by radial homothetic transformation with a coefficient 0.9391, i.e. by shrinkage of 6.09%.

FIG. 14 schematically represents a set of opto-geometric properties of the fourth example of dispersion managed optical fibre according to the invention.

The invention claimed is:

1. Multimode optical fibre in which at least one higher-order mode can be propagated,
   being constituted radially by a single central core surrounded by an optical cladding (13), wherein the optical fibre comprises, for said higher mode or for at least one of said higher-order modes, positive chromatic dispersion optical fibre portions (D+) alternating longitudinally with negative chromatic dispersion optical fibre portions (D−).

2. Optical fibre according to claim 1, wherein each portion (D+, D−) of optical fibre has a chromatic dispersion slope (C') whose absolute value is less than 0,015 ps/nm²·km at the wavelength 1550 nm for said higher-order mode.

3. Optical fibre according to claim 1, wherein each portion (D+, D−) of optical fibre has an effective surface area ($S_{eff}$) greater than 70 μm² at the wavelength 1550 nm for said higher-order mode.

4. Optical fibre according to claim 3, wherein each portion (D+, D−) of optical fibre has an effective surface area ($S_{eff}$) greater than 80 μm² at the wavelength 1550 nm for said higher-order mode.

5. Optical fibre according to claim 4, wherein each portion (D+, D−) of optical fibre has an effective surface area ($S_{eff}$) greater than 200 pmt at the wavelength 1550 nm for said higher-order mode.

6. Optical fibre according to claim 1, wherein the higher-order mode is the $LP_{02}$ mode.

7. Optical fibre according to claim 1, wherein the coreas a variable index profile comprising at least three slices (10, 11, 12, 14, 15).

8. Optical fibre according to claim 7, where in the slices (10, 11, 14, 15) of the core have an index greater than the cladding index (13).

9. Optical fibre according to claim 7, wherein the slice of the core which is most distant (12) from the centre has an index lower than the cladding index (13).

10. Optical fibre according to claim 1, wherein the core has a variable index profile comprising a central slice (10) having an index greater than that of the cladding (13) and in that the variable index profile of the core also comprises a slice (11) which is situated in contact with the central slice (10) and which is a pedestal whose index is between that of the cladding (13) and that of the central slice (10).

11. Optical fibre according to claim 1, wherein said optical fibre is obtained by drawing out one and the same preform starting from modification of the properties of said preform.

12. Optical fibre according to claim 1, wherein the core has a relative difference of the peripheral radius between the positive chromatic dispersion optical fibre portions (D+) and the negative chromatic dispersion optical fibre portions (D−), said relative difference being less than 11%.

13. Optical fibre according to claim 1, wherein the optical fibre has a ratio of effective surface area ($S_{eff}$) to core section of at least 10% at 1550 nm for said higher-order mode.

* * * * *